Jan. 17, 1928.
S. GREENHOUSE
1,656,670
PRESSURE REGULATING VALVE
Filed April 23, 1923
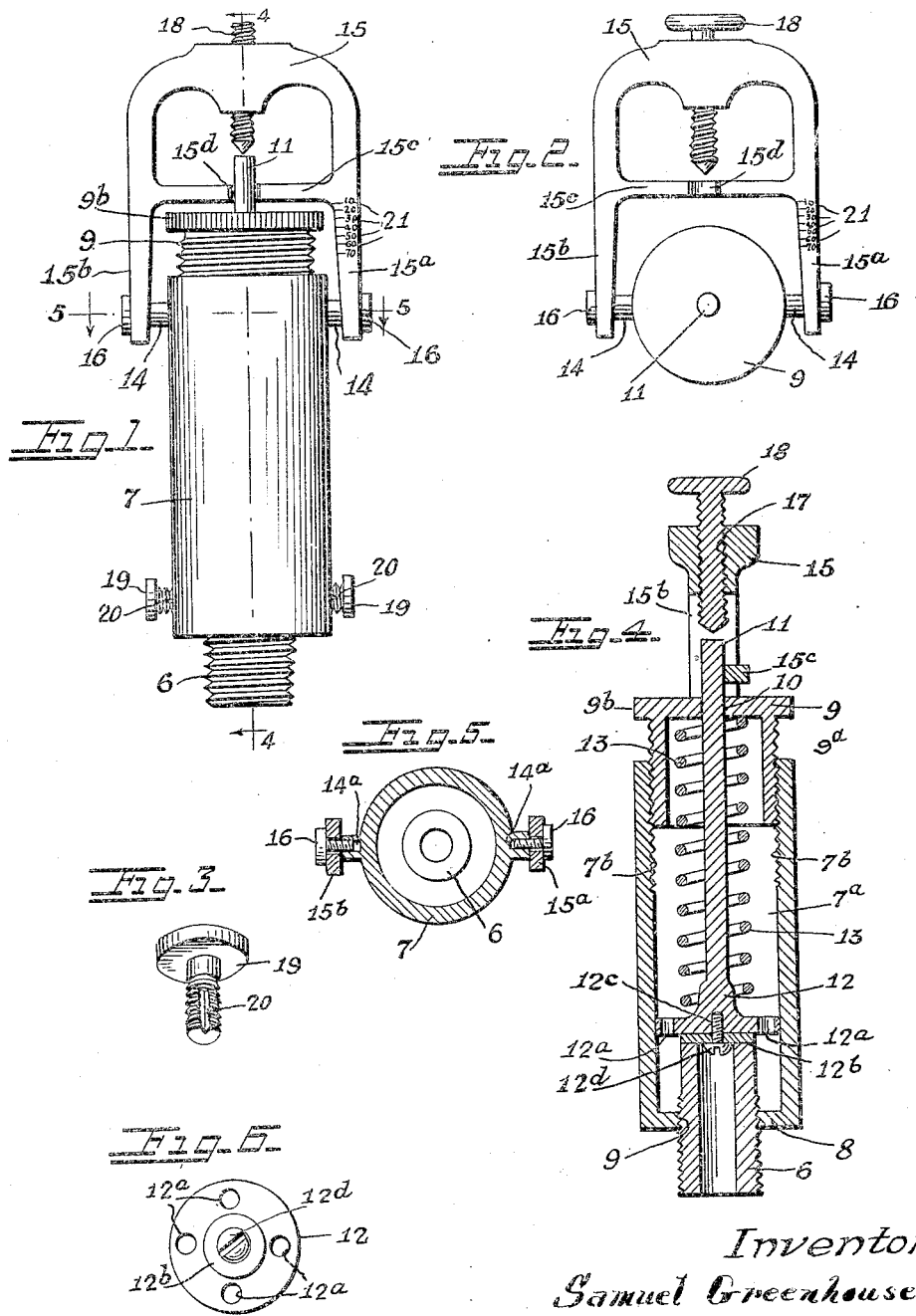
Inventor.
Samuel Greenhouse
By F. E. Shannon
Attorney.

Patented Jan. 17, 1928.

1,656,670

UNITED STATES PATENT OFFICE.

SAMUEL GREENHOUSE, OF AKRON, OHIO.

PRESSURE-REGULATING VALVE.

Application filed April 23, 1923. Serial No. 633,983.

This invention relates to new and useful improvements in spring controlled, pressure regulating valves; and, while the device of the invention is adapted for general use and may be used as a safety valve or pop valve, it is particularly adapted for use as a pressure regulator in connection with the filling tanks of bottle filling machines of the type shown and described in my pending application, Serial Number 560,876.

Objects of the invention are to provide a valve of the type above indicated which will be strong and durable and which, in use, will provide efficient reliable means whereby an even pressure may be accurately maintained within a tank or pressure chamber.

The filling tank of a bottling machine of the ordinary construction is designed to hold a quantity of carbonated water or other liquid which is maintained at a certain level in the tank. The upper portion of the tank should be filled with gas which must be maintained at a certain pressure to prevent, or reduce to a minimum, the escape of gas with which the water is charged. As the flow of liquid from the tank must necessarily be somewhat intermittent, it is extremely difficult to maintain a constant pressure therein. The device of this invention is particularly designed for use on such tanks and aims to provide means whereby the pressure in the tank may be adjusted in accordance with the pressure desired in the bottles, the invention providing new and improved parts and combinations of parts whereby the device may be selectively adjusted to operate when subjected to a predetermined pressure.

A further object of the invention is to provide an automatically operable pressure regulating device having new and improved means which, when the device is in operation, will prevent a sudden reduction in pressure within the chamber on which it is installed.

A still further object is to provide a pressure regulating valve having parts of a construction and arrangement that will render all parts readily accessible and will permit any part to be quickly removed and repaired or replaced.

Other objects and advantages will be obvious and will be easily understood as the invention is described in the following specification, when the same is considered in connection with the accompanying drawing in which I have illustrated a preferred embodiment of the invention, it being understood that the invention is capable of various adaptations and that changes and modifications may be made and substitutions resorted to which come within the scope of the claims hereunto appended.

In the drawings which form a part hereof and in which similar characters of reference are employed to designate like parts as the same are shown in any of the several views and in which:—

Figure 1 is a side elevational view of a pressure regulating valve constructed in accordance with this invention.

Figure 2 is a top plan view of the same with the hinged top portion in a horizontal position.

Figure 3 is a perspective view of one of the screws employed to regulate the size of the openings provided for the escape of air, gas or other fluid.

Figure 4 is a central, vertical, sectional view taken as indicated by the lines 4—4 of Figure 1.

Figure 5 is a cross sectional view taken as indicated by the lines 5—5 of Figure 1.

Figure 6 is a plan view showing the bottom of the valve head employed in carrying out this invention.

Proceeding now to a detailed description of the invention with reference to the particular embodiment thereof shown in the accompanying drawing, the numeral 6 denotes a tubular plug or pipe which is externally threaded and is adapted to be secured in a threaded opening in the wall of a pressure tank. The numeral 7 denotes a hollow cylindrical member which forms the body of my improved device. The tubular body 7 is provided with the bottom wall 8 which is provided with a centrally positioned threaded bore 9 adapted to receive the threaded plug 6. The plug 6 is secured in said bore with the upper portion thereof projecting upwardly into the cavity 7ª of the body 7. The body is normally open at the upper end and is internally threaded adjacent the upper end thereof with the screw threads 7ᵇ which are adapted to receive the exteriorly threaded plug 9, fitted in the upper end of the body 7 to close the upper end thereof. The plug 9 is provided with the cylindrical cavity 9ª which projects therein from the lower end thereof and communicates with the cavity 7ª of the body 7. The upper wall of the plug 9 extends outwardly to provide an annular, circumferential extending flange 9$^b$, the outer surface of which is milled or knurled so that it may be engaged by the fingers and the plug 9 operated in the screw threads 7$^b$. The plug 9 is provided in the upper wall thereof with a coaxially arranged bore 10 adapted to receive the valve rod 11 which is slidably mounted therein so as to project coaxially into the cavity 7$^a$. The valve rod 11 is provided at the lower end thereof with a valve head 12 which seats on the upper end of the tube 6 so as to close the upper end thereof. The numeral 13 denotes a coil spring mounted on the rod 11, the said spring being compressed between the valve head 12 and the upper wall of the plug 9 so as to normally hold the said head 12 in a downward position.

The body 7 is provided at points adjacent the upper end thereof and at diametrically opposite points with the trunnion 14 on which is pivotally mounted the forked frame 15. The frame 15 is provided with the fork members 15$^a$ and 15$^b$, which are provided at the lower ends thereof with suitable alined bores adapted to receive the headed screws 16 which are positioned through said bores and operatively secured in suitable threaded bores which project coaxially into the said trunnions. The frame 15 is provided with the horizontal cross bar 15$^c$ which extends between the fork members 15$^a$ and 15$^b$ and a centrally positioned semi-circular notch 15$^d$ is formed in said cross bar so as to receive the rod 11, when the frame 15 is in a vertical position. The frame 15 is provided at the outer end thereof with the threaded bore 17 which is arranged therein so as to be in axial alinement with the bore 10 when the frame is in a vertical position. A headed screw 18 is operatively threaded in the bore 17 so as to project downwardly toward the upper end of the rod 11, the said screw being arranged to limit the upward movement of said rod.

The body is provided adjacent the lower end thereof at points below the upper end of the tube 6 with a plurality of threaded bores which are arranged therein to receive the screws 19. Each screw 19 is provided on the threaded surface thereof with a longitudinally directed slot 20 which is preferably of V-shaped cross section and is relatively deeper at the end of the screw. The slot 20 in the screw forms an outlet for the escape of fluid from the chamber 7$^a$ and it will be seen that this outlet may be regulated by operating the screws 19 in said bores. One of the forks 15$^a$ is provided on one lateral face thereof with graduated marks 21 which indicate the pressure required in the tube 6 to move the valve head upwardly and permit the fluid to escape in to the chamber 7$^a$, the mark on the scale 21 in the same horizontal plane as the plug 9 indicating the pressure at which the device will operate.

The valve rod 12 is shown in the drawings as being integral with the stem 11 and is arranged to closely fit the cylindrical cavity 7$^a$ of the body 7. The head 12 is provided with a plurality of spaced bores 12$^a$ which are arranged therein adjacent the peripheral edge thereof. The head 12 is provided with threaded axial bore 12$^c$ and a packing member 12$^b$ is secured to the lower face thereof by means of a screw 12$^d$ which is threaded in said bore 12$^c$.

In use, the tube 6 is secured to the tank or pressure chamber with the cavity of the tube in communication with the pressure chamber. The flange 9$^b$ is then operated to the point on the graduated scale 21 which indicates the pressure at which the device is to operate. The screw 18 is operated to a point in spaced relation to the top of the rod 11 to limit the upward movement of the valve 12 and the screws 19 are operated to provide an escape opening of the desired size.

When the pressure against the lower face of the valve overcomes the action of the spring 13, the valve is moved upwardly releasing the pressure in the chamber 7$^a$. As the escape openings 20 are relatively small a pressure is formed in the chamber 7$^a$ which is exerted on the upper surface of the valve head 12 and permits the valve to be closed by the action of the spring 13 when the pressure within the tank has been reduced as desired.

It will be noted that should the spring 13 for any reason become weakened or otherwise defective or that in case it is found that the graduation 21 do not accurately indicate the pressure at which the device is operable, the same may be quickly and conveniently adjusted by operating the plug 6 in the bore 9, thus varying the initial compression of the spring 13.

To remove the various parts of my improved valve herein shown and described, the frame 15 is swung downwardly as shown in Figure 2 and the plug 9 is removed from the body whereby the rod 11 and the spring 13 may be conveniently removed from the body 7.

It will thus be seen that this invention provides a pressure regulating device which when installed on a tank of a bottle filling machine or other pressure chamber, will reduce to a minimum variations in pressure resulting from an intermittent flow of liquid from such chamber.

Having thus illustrated my invention and described a particular embodiment thereof in detail, what I claim as new and desire to secure by Letters Patent is:—

1. In a valve of the class described an exteriorly threaded tube adapted for connection with a pressure chamber, a hollow cylindrical body having a coaxially arranged threaded bore in the bottom thereof in which said tube is secured so as to project upwardly therein from the bottom thereof, the upper end of said body being provided with interior screw threads, an exteriorly threaded plug operatively secured in said upper end, a coaxially arranged bore in said plug, a valve rod secured in said last mentioned bore, a valve on the lower end of said rod, a coil spring mounted on said rod and compressed between said plug and said valve, said spring adapted to normally hold said valve in a seated position on the top of said tube and adjustable openings in the lower wall of the body at points below the top of said tube.

2. In a valve of the class described an exteriorly threaded tube adapted for connection with a pressure chamber, a hollow cylindrical body having a coaxially arranged threaded bore in the bottom thereof in which said tube is secured so as to project upwardly therein from the bottom thereof, the upper end of said body being provided with interior screw threads, an exteriorly threaded plug operatively secured in said upper end, a coaxially arranged bore in said plug, a valve rod secured in said last mentioned bore, a valve on the lower end of said rod, a coil spring mounted on said rod and compressed between said plug and said valve, said spring adapted to normally hold said valve in a seated position on the top of said tube; adjustable openings in the lower wall of the body at points below the top of said tube and adjustable means to limit the upward movement of said valve rod.

3. In a valve of the class described, a hollow cylindrical body, a tube adapted to connect said body to a pressure chamber, said tube extending coaxially into the cavity of said body and being adjustable axially thereof, a screw plug secured in the upper end of said body so as to be axially adjustable; a coaxially arranged bore through said plug, a valve rod mounted in said bore, a valve on the lower end of said rod, a coil spring mounted on said rod and compressed between said valve and said plug; a forked frame pivotally secured to the upper end of said body so as to be capable of rotary movement on an axis diametrically therethrough and adjustable means associated with said frame to limit the upward movement of said valve rod.

4. In a valve of the class described, a hollow cylindrical body, a tube adapted to connect said body to a pressure chamber, said tube extending coaxially into the cavity of said body and being adjustable axially thereof, a screw plug secured in the upper end of said body so as to be axially adjustable, a coaxially arranged bore through said plug, a valve rod mounted in said bore, a valve on the lower end of said rod, a coil spring mounted on said rod and compressed between said valve and said plug, a forked frame pivotally secured to the upper end of said body so as to be capable of rotary movement on an axis extending diametrically therethrough, a graduated scale on one of the forks of said frame, said scale indicating at a point level with the top of said plug, the pressure at which the device is operable.

5. In a valve of the class described, a hollow cylindrical body, a tube adapted to connect said body to a pressure chamber, said tube extending coaxially into the cavity of said body and being adjustable axially thereof, a screw plug secured in the upper end of said body so as to be axially adjustable, a coaxially arranged bore through said plug, a valve rod mounted in said bore, a valve on the lower end of said rod, a coil spring mounted on said rod and compressed between said valve and said plug, a forked frame pivotally secured to the upper end of said body so as to be capable of rotary movement on an axis extending diametrically therethrough, a central portion of said frame being provided with a threaded bore arranged therein to be in coaxial alinement with the said valve rod when the frame is in a vertical position, a headed screw mounted in said bore, said screw arranged to project downwardly from said frame and engage said valve rod to limit the upward movement thereof.

In testimony whereof I have hereunto set my hand.

SAMUEL GREENHOUSE.